United States Patent
Matter et al.

(10) Patent No.: US 11,214,641 B2
(45) Date of Patent: Jan. 4, 2022

(54) THICKENING ANIONIC COPOLYMER

(71) Applicant: COATEX, Genay (FR)

(72) Inventors: Yves Matter, Quincieux (FR); Jean-Marc Suau, Lucenay (FR); Francis Bony, Quincieux (FR); Francois Dupont, Lyons (FR)

(73) Assignee: COATEX, Genay (FR)

( * ) Notice: Subject to any disclaimer, the term of this patent is extended or adjusted under 35 U.S.C. 154(b) by 21 days.

(21) Appl. No.: 16/327,020

(22) PCT Filed: Sep. 29, 2017

(86) PCT No.: PCT/FR2017/052670
§ 371 (c)(1),
(2) Date: Feb. 21, 2019

(87) PCT Pub. No.: WO2018/060652
PCT Pub. Date: Apr. 5, 2018

(65) Prior Publication Data
US 2019/0211125 A1 Jul. 11, 2019

(30) Foreign Application Priority Data
Sep. 30, 2016 (FR) ...................... 1659429

(51) Int. Cl.
| | | |
|---|---|---|
| *C08F 220/28* | (2006.01) | |
| *C08F 216/14* | (2006.01) | |
| *C08K 5/42* | (2006.01) | |
| *C08F 265/04* | (2006.01) | |
| *C08F 2/22* | (2006.01) | |
| *C08K 3/013* | (2018.01) | |
| *C08K 3/22* | (2006.01) | |
| *D21H 19/60* | (2006.01) | |
| *C09D 1/12* | (2006.01) | |
| *C09D 7/44* | (2018.01) | |
| *C09D 5/04* | (2006.01) | |
| *C09D 7/43* | (2018.01) | |
| *D21H 19/20* | (2006.01) | |
| *D21H 19/82* | (2006.01) | |
| *D21H 19/58* | (2006.01) | |
| *D21H 19/56* | (2006.01) | |
| *C08K 3/26* | (2006.01) | |
| *C08K 3/34* | (2006.01) | |
| *C08L 33/04* | (2006.01) | |

(52) U.S. Cl.
CPC .............. *C08F 220/28* (2013.01); *C08F 2/22* (2013.01); *C08F 216/1416* (2013.01); *C08F 265/04* (2013.01); *C08K 3/013* (2018.01); *C08K 3/22* (2013.01); *C08K 3/26* (2013.01); *C08K 3/346* (2013.01); *C08K 5/42* (2013.01); *C09D 1/12* (2013.01); *C09D 5/04* (2013.01); *C09D 7/43* (2018.01); *C09D 7/44* (2018.01); *D21H 19/20* (2013.01); *D21H 19/56* (2013.01); *D21H 19/58* (2013.01); *D21H 19/60* (2013.01); *D21H 19/82* (2013.01); *C08F 2800/20* (2013.01); *C08K 2003/2241* (2013.01); *C08K 2003/265* (2013.01); *C08L 33/04* (2013.01)

(58) Field of Classification Search
CPC ......................... C08F 216/1416; C08F 220/18
See application file for complete search history.

(56) References Cited

U.S. PATENT DOCUMENTS

| | | |
|---|---|---|
| 2004/0019148 A1 | 1/2004 | Suau et al. |
| 2005/0143511 A1 | 6/2005 | Suau et al. |
| 2012/0046404 A1 | 2/2012 | Suau et al. |
| 2012/0230920 A1 | 9/2012 | Souzy et al. |
| 2014/0178325 A1 | 6/2014 | Martinez-Castro et al. |
| 2017/0037170 A1 | 2/2017 | Gonzalez et al. |

FOREIGN PATENT DOCUMENTS

| | | | |
|---|---|---|---|
| EP | 2 933 280 A1 | 10/2015 | |
| FR | 2 810 261 A1 | 12/2001 | |
| FR | 2 963 939 A1 | 2/2012 | |
| FR | 2 972 349 A1 | 9/2012 | |

OTHER PUBLICATIONS

International Search Report dated Nov. 30, 2017 in PCT/FR2017/052670 filed on Sep. 29, 2017.

*Primary Examiner* — Wenwen Cai
(74) *Attorney, Agent, or Firm* — Oblon, McClelland, Maier & Neustadt, L.L.P.

(57) ABSTRACT

The invention relates to a copolymer obtained by polymerisation reaction of at least three comonomers: a first anionic monomer, a second monomer comprising an olefin unsaturation, and a third monomer comprising a hydrophobic group. The invention likewise relates to the use of said copolymer as a thickening agent, in particular in aqueous suspensions of mineral particles with high solids content. The copolymer according to the invention makes it possible to improve the compromise between viscosity with high shear gradient and viscosity with low shear gradient, while also improving water retention inside the suspension.

15 Claims, No Drawings

THICKENING ANIONIC COPOLYMER

The invention relates to a copolymer obtained by a polymerization reaction of at least three comonomers: a first anionic monomer, a second monomer comprising an olefinic unsaturation and a third monomer comprising a hydrophobic group. The invention also relates to the use of this copolymer as thickening agent, in particular in aqueous slurries of inorganic particles having a high solids content. The copolymer according to the invention makes it possible to improve the compromise between the viscosity under a high shear gradient and the viscosity under a low shear gradient, while improving the water retention within the slurry.

Thickening copolymers used for the preparation of aqueous slurries of inorganic particles, in particular for the preparation of paper coating colours, are known.

As well as the improvement in the final properties of the paper prepared by means of these paper coating colours, it is also necessary to improve the conditions of preparation and the conditions of processing of these aqueous slurries of inorganic particles.

As regards the final properties of the paper, the importance of the optical properties should be emphasized, in particular the whiteness of the paper. The improvement in the mechanical properties of the paper should also be targeted.

As regards the properties of the aqueous slurries of inorganic particles, their high content of inorganic particles should be sought. Furthermore, these slurries have to have viscosities under different shear gradients which make it possible to use them effectively, in particular during their application at the surface of a paper sheet. These slurries have to have an apparent viscosity, thus under a low shear gradient, which is well suited to an effective application.

They also have to have a viscosity under a high shear gradient, in particular an ACAV viscosity, which is reduced, in order for an excess of aqueous slurry to be able to be easily removed, in particular by means of a scraper, without detrimentally affecting the layer applied to the paper. This is because a paper coating colour having a high viscosity under a high shear gradient will require a greater blade pressure in order to be able to control the weight of coat deposited on the paper. Failing that, there is a risk of an undesirable phenomenon appearing: the overflowing of the colour, which can result in the formation of smears or beads at the surface of the coated paper. Defects, in particular scratches, may then also appear.

Furthermore, increasing the viscosities under high and low shear gradients can have consequences with regard to the phenomenon of migration of water and water-soluble substances through the paper. This migration has to be reduced as much as possible, in particular in order to prevent a change in the rheology of the paper coating colour which is not used and which is recycled in the coating process. It is thus necessary to effectively control the water retention of the paper coating colour.

Furthermore, the viscosity of the slurries has to be controlled and make it possible for them to be able to be easily pumped or filtered, in particular in feed circuits of processes for the coating of paper.

These slurries also have to make it possible to limit, indeed even to prevent, the formation of foams or of splatters. They also have to limit or prevent the settling of the particles used.

The compatibility of the different constituents of a paper coating colour also has to be taken into account. In particular, it is important for the thickening copolymer and the binding latex used to have good compatibility.

FR 2963939 relates to a paper coating colour which comprises a copolymer prepared from an indispensable hydrophobic monomer which is styrene or else a (meth) acrylic ester, for example ethyl acrylate, which does not comprise an ethoxylated or propoxylated group. FR 2972349 relates to a cosmetic formulation which contains a water-insoluble comb copolymer of the same type. EP 2933280 discloses a polymer for controlling the rheology of a washing composition or of a cosmetic composition prepared from 5 monomers, including at least one non-ionic monomer. US 20140178325 and FR 2810261 disclose a polymer of HASE type based on ethyl acrylate.

The polymeric agents used as thickening agents do not always make it possible to provide a satisfactory solution to these different problems.

There thus exists a need to have available improved thickening agents.

The copolymer according to the invention makes it possible to provide a solution to all or some of the problems of the thickening agents of the state of the art.

Thus, the invention provides a copolymer (P1) obtained by a polymerization reaction:
  (a1) of at least one anionic monomer comprising at least one polymerizable olefinic unsaturation,
  (b1) of at least one monomer of formula (I):

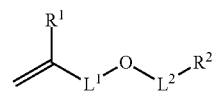

in which:
  $R^1$ and $R^2$, which are identical or different, independently represent H or $CH_3$,
  $L^1$ independently represents a group chosen from $C(O)$, $CH_2$ and $CH_2$—$CH_2$,
  $L^2$ independently represents a group chosen from $(CH_2—CH_2O)_x$, $(CH(CH_3)CH_2O)_y$ and their combinations, and
  x and y, which are identical or different, independently represent 0 or an integer or decimal number between 0.1 and 150, x is strictly greater than y and the sum x+y is between 10 and 150, and
  (c1) of at least one monomer of formula (II):

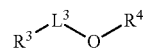

in which:
  $R^3$ independently represents a group comprising at least one polymerizable olefinic unsaturation,
  $R^4$ independently represents a saturated, unsaturated or aromatic and linear, branched or cyclic hydrocarbon group comprising from 6 to 40 carbon atoms,
  $L^3$ independently represents a group chosen from $(OCH_2—CH_2)_m$, $(OCH(CH_3)CH_2)_n$ and their combinations, and
  m and n, which are identical or different, independently represent 0 or an integer or decimal number between 0.1 and 150, m is strictly greater than n and the sum m+n is between 10 and 150.

Preferably, according to the invention, the anionic monomer (a1) comprises at least one polymerizable ethylenic unsaturation.

The copolymer (P1) can be obtained by a polymerization reaction employing one or at least two different anionic monomers (a1) and comprising at least one polymerizable olefinic unsaturation, preferably a polymerizable ethylenic unsaturation.

Preferably, the polymerization reaction employs two different anionic monomers (a1) and comprises at least one polymerizable olefinic unsaturation, preferably a polymerizable ethylenic unsaturation.

Preferably, the monomer (a1) is an anionic monomer comprising at least one polymerizable olefinic unsaturation and at least one carboxylic acid functional group.

Preferably, it is an acid chosen from acrylic acid, methacrylic acid, their mixtures and their salts, more preferably acrylic acid or one of its salts.

As well as acrylic acid, methacrylic acid, their salts and their mixtures, the anionic monomer (a1) can also combine with them at least one other anionic monomer chosen from crotonic acid, itaconic acid and maleic acid. Such an additional anionic monomer is then employed in a lower amount than the amount of monomer (a1).

According to the invention, the weight ratio of the two anionic monomers (a1) can vary fairly widely. Preferably, this ratio ranges from 5 to 150, preferably from 10 to 120. Advantageously, the polymerization reaction employs acrylic acid and methacrylic acid, and also their salts. Also advantageously, they are employed in an (acrylic acid/methacrylic acid) weight ratio ranging from 5 to 150, preferably ranging from 10 to 120.

During the polymerization reaction, the amount of monomer (a1) can vary fairly widely. Preferably, the polymerization reaction employs from 5% to 30% by weight, preferably from 6% to 25% by weight, more preferably from 8% to 15% by weight, of monomer (a1), based on the total amount by weight of monomers.

As well as the monomer (a1), the polymerization reaction also employs a monomer (b1) of formula (I).

Preferably, the monomer (b1) is a compound of formula (I) for which:
$R^1$ represents H or
$L^1$ represents a group chosen from C(O) and $CH_2$ or
$L^2$ represents a group combining $(CH_2-CH_2O)_x$ and $(CH(CH_3)CH_2O)_y$ or
x represents an integer or decimal number between 10 and 140 or
y represents an integer or decimal number between 10 and 140 or
x is strictly greater than y and the sum x+y is between 10 and 150.

More preferably, the monomer (b1) is a compound of formula (I) for which:
$R^1$ represents H,
$L^1$ represents a group chosen from C(O) and $CH_2$,
$L^2$ represents a group combining $(CH_2-CH_2O)_x$ and $(CH(CH_3)CH_2O)_y$,
x represents an integer or decimal number between 10 and 140,
y represents an integer or decimal number between 10 and 140 and
x is strictly greater than y and the sum x+y is between 10 and 150.

Also preferably, the monomer (b1) is a compound of formula (I) for which:
x represents an integer or decimal number between 15 and 140,
y represents an integer or decimal number between 10 and 135 and
x is strictly greater than y and the sum x+y is between 10 and 150.

Also preferably, the monomer (b1) is a compound of formula (I) for which:
$R^1$ represents H or
$L^1$ represents a group chosen from C(O) and $CH_2$ or
$L^2$ represents a group combining $(CH_2-CH_2O)_x$ and $(CH(CH_3)CH_2O)$, or
x represents an integer or decimal number between 10 and 140 or
y represents 0.

More preferably, the monomer (b1) is a compound of formula (I) for which:
$R^1$ represents H,
$L^1$ represents a group chosen from C(O) and $CH_2$,
$L^2$ represents a group combining $(CH_2-CH_2O)_x$ and $(CH(CH_3)CH_2O)_y$,
x represents an integer or decimal number between 10 and 140 and
y represents 0.

Also preferably, the monomer (b1) is a compound of formula (I) for which:
x represents an integer or decimal number between 15 and 140 and
y represents 0.

Particularly preferably, the monomer (b1) is a compound of formula (I) for which x represents an integer or decimal number between 15 and 80 and y represents an integer or decimal number between 10 and 65.

More particularly preferably, the monomer (b1) is a compound of formula (I) for which x represents an integer or decimal number between 30 and 65 and y represents an integer or decimal number between 15 and 40.

Monomers (b1) which are even more particularly preferred are compounds of formula (I) for which x represents an integer or decimal number between 40 and 60 and y represents an integer or decimal number between 20 and 30.

A preferred example of monomer (b1) is a compound of formula (I) for which x represents 46 and y represents 15.

Also particularly preferably, the monomer (b1) is a compound of formula (I) for which x represents an integer or decimal number between 15 and 80 and y represents 0.

More particularly preferably, the monomer (b1) is a compound of formula (I) for which x represents an integer or decimal number between 30 and 65 and y represents 0.

Monomers (b1) which are even more particularly preferred are compounds of formula (I) for which x represents an integer or decimal number between 40 and 60 and y represents 0.

Another preferred example of monomer (b1) is a compound of formula (I) for which x represents 50 and y represents 0.

During the polymerization reaction, the amount of monomer (b1) can vary fairly widely. Preferably, the polymerization reaction employs from 60% to 90% by weight, preferably from 65% to 90% by weight, more preferably from 75% to 90% by weight or from 75% to 85% by weight, of monomer (b1), based on the total amount by weight of monomers. As well as the monomers (a1) and (b1), the polymerization reaction also employs a monomer (c1).

The copolymer (P1) can be obtained by a polymerization reaction employing one or at least two different monomers (c1). The use of one or of two different monomers (c1) is preferred.

For the monomer of formula (II), $R^3$, which is identical or different, can independently represent a group comprising at least one polymerizable olefinic unsaturation chosen from an ester functional group of a derivative chosen from acrylic acid, methacrylic acid, maleic acid, itaconic acid or crotonic acid, preferably a group comprising a functional group chosen from acrylate, methacrylate, acrylurethane and methacrylurethane, in particular a methacrylate functional group. $R^3$ can also represent a vinyl group, an allyl group, a methallyl group or an isoprenyl group.

Preferably, the monomer (c1) is a monomer of formula (II) in which $R^4$ independently represents a saturated, unsaturated or aromatic and linear, branched or cyclic hydrocarbon group comprising from 6 to 40 carbon atoms.

Also preferably, the monomer (c1) is a monomer or formula (II) in which m and n, which are identical or different, independently represent 0 or an integer or decimal number between 0.1 and 150, m is strictly greater than n and the sum m+n is between 10 and 150.

More preferably, the monomer (c1) is a compound of formula (II) in which:
  m represents an integer or decimal number between 15 and 140,
  n represents an integer or decimal number between 10 and 135 and
  m is strictly greater than n and the sum m+n is between 10 and 150.

More preferably still, the monomer (c1) is a compound of formula (II) in which:
  $R^3$, which is identical or different, independently represents a group comprising at least one polymerizable olefinic unsaturation chosen from an ester functional group of a derivative chosen from acrylic acid, methacrylic acid, maleic acid, itaconic acid or crotonic acid, preferably a group comprising a functional group chosen from acrylate, methacrylate, acrylurethane and methacrylurethane, in particular a methacrylate functional group, or
  $R^4$, which is identical or different, independently represents a linear or branched $C_6$-$C_{40}$ alkyl group, preferably a linear or branched $C_8$-$C_{22}$ alkyl group, more preferably a linear or branched $C_8$-$C_{16}$ alkyl group, or
  $L^3$ represents a $(OCH_2CH_2)_m$ group, or
  m represents an integer or decimal number between 10 and 140, or
  n represents an integer or decimal number between 10 and 140, or
  m is strictly greater than n and the sum m+n is between 10 and 150.

Much more preferably, the monomer (c1) is a compound of formula (II) in which:
  $R^3$, which is identical or different, independently represents a group comprising at least one polymerizable olefinic unsaturation chosen from an ester functional group of a derivative chosen from acrylic acid, methacrylic acid, maleic acid, itaconic acid or crotonic acid, preferably a group comprising a functional group chosen from acrylate, methacrylate, acrylurethane and methacrylurethane, in particular a methacrylate functional group,
  $R^4$ independently represents a linear or branched $C_6$-$C_{40}$ alkyl group, preferably a linear or branched $C_8$-$C_{22}$ alkyl group, more preferably a linear or branched $C_8$-$C_{16}$ alkyl group,
  $L^3$ represents a $(OCH_2CH_2)_m$ group, and
  m represents an integer or decimal number between 10 and 140.

During the polymerization reaction, the amount of monomer (c1) can vary fairly widely. Preferably, the polymerization reaction employs from 0.5% to 30% by weight, preferably from 1% to 25% by weight, more preferably from 2% to 15% by weight, of monomer (c1), based on the total amount by weight of monomers.

As well as the monomers (a1), (b1) and (c1), the polymerization reaction can also employ an additional monomer comprising at least two ethylenic unsaturations. This additional monomer is generally a cross-linking monomer.

Thus, the copolymer (P1) can be obtained by a polymerization reaction also employing:
  (d1) 2-acrylamido-2-methylpropanesulfonic acid (AMPS), 2-sulfoethyl methacrylate, sodium methallylsulfonate, styrenesulfonate or one of their salts, or
  (e1) at least one crosslinking monomer or at least one monomer comprising at least two olefinic unsaturations.

Advantageously, according to the invention, the monomer (d1) can be employed in the form of a salt. Examples of salts of AMPS are the alkali metal salts, such as the sodium, potassium or lithium salts, the alkaline earth metal salts, such as the calcium or magnesium salts, the ammonium salts or the alkylated ammonium salts, such as the salts of 2-amino-2-methyl-1-propanol (AMP), of ethanolamine, of diethanolamine or of triethanolamine.

The preferred AMPS salts are the sodium and ammonium salts.

During the polymerization reaction, the amount of monomer (d1) can vary fairly widely. Preferably, the polymerization reaction employs from 0.1% to 7% by weight, preferably from 0.5% to 5% by weight, more preferably from 1% to 3% by weight, of monomer (d1), based on the total amount by weight of monomers.

Advantageously, according to the invention, the monomer (e1) is a compound comprising at least two reactive functional groups, in particular two polymerizable olefinic unsaturations. Preferably, the monomer (e1) is a compound comprising at least two ethylenic unsaturations. Such monomers (e1) are known as such.

Mention may be made, as monomer (e1), of crosslinking unsaturated monomers, for example polyunsaturated aromatic monomers, such as divinylbenzene, divinylnaphthalene and trivinylbenzene, polyunsaturated alicyclic monomers, for example 1,2,4-trivinylcyclohexane, difunctional esters of phthalic acid, such as diallyl phthalate, polyalkenyl ethers, such as triallyl pentaerythritol, diallyl pentaerythritol, diallyl sucrose, octaallyl sucrose and trimethylolpropane diallyl ether, polyunsaturated esters of polyalcohols or of polyacids, such as 1,6-hexanediol di(meth)acrylate, tetramethylene tri(meth)acrylate, allyl acrylate, diallyl itaconate, diallyl fumarate, diallyl maleate, trimethylolpropane tri(meth)acrylate, trimethylolpropane di(meth)acrylate, poly(alkyleneoxy) glycol di(meth)acrylates and polyethylene glycol di(meth)acrylate, alkylenebisacrylamides, such as methylenebisacrylamide and propylenebisacrylamide, hydroxy or carboxy derivatives of methylenebisacrylamide, such as N,N-bis(methylol)methylenebisacrylamide, polyalkylene glycol di(meth)acrylates, such as ethylene glycol di(meth)acrylate, diethylene glycol di(meth)acrylate, triethylene glycol di(meth)acrylate, allyl methacrylate, ethylene glycol dimethacrylate, butylene glycol dimethacrylate, pentaerythritol di-, tri- and tetraacrylates, poly(alkyleneoxy) glycol di(meth)acrylates, such as polyethylene glycol diacrylates, bisphenol A diacrylates, butanediol dimethacrylate, 2,2-dimethylpropanediol dimethacrylate, phenylene diacrylate and their mixtures.

During the polymerization reaction, the amount of monomer (e1) can vary fairly widely. Preferably, the polymerization reaction employs from 0.01% to 5% by weight, preferably from 0.05% to 3% by weight, more preferably from 0.05% to 1% by weight, of monomer (e1), based on the total amount by weight of monomers.

The invention also relates to aqueous compositions comprising water and at least one copolymer according to the invention. These aqueous compositions according to the invention can also comprise other polymers.

Thus, the invention provides a composition (C1) comprising at least one copolymer (P1) according to the invention and water. Preferably, the composition (C1) comprises, on a dry basis, from 10% to 60%, preferably from 20% to 40%, by weight of copolymer (P1), based on the total amount by weight of composition.

The invention also provides a composition (C2) comprising at least one copolymer (P1) according to the invention, water and at least one polymer (P2) of HASE type. Preferably, the composition (C2) comprises, on a dry basis:
  from 60% to 95%, preferably from 65% to 75%, by weight of copolymer (P1) and
  from 5% to 40%, preferably from 25% to 35%, by weight of polymer (P2) of HASE type, based on the total amount by weight of composition.

The invention also provides a composition (C3) comprising at least one copolymer (P1) according to the invention, water and at least one polymer (P3) of ASE type. Preferably, the composition (C3) comprises, on a dry basis:
  from 40% to 95%, preferably from 60% to 95%, by weight of copolymer (P1) and
  from 5% to 60%, preferably from 5% to 40%, by weight of polymer (P3) of ASE type, based on the total amount by weight of composition.

The invention also provides a composition (C4) comprising at least one copolymer (P1) according to the invention, water, at least one polymer (P2) of HASE type and at least one polymer (P3) of ASE type. Preferably, the composition (C4) comprises, on a dry basis:
  from 40% to 95%, preferably from 60% to 95%, by weight of copolymer (P1),
  from 1% to 59%, preferably from 1% to 39%, by weight of polymer (P2) of HASE type and
  from 1% to 59%, preferably from 1% to 39%, by weight of polymer (P3) of ASE type, based on the total amount by weight of composition.

Preferably, according to the invention, for the compositions according to the invention, the polymer (P2) of HASE type is in the form of an emulsion comprising water and at least one copolymer obtained by a polymerization reaction:
  (a2) of at least one anionic monomer comprising at least one polymerizable olefinic unsaturation, preferably an anionic monomer comprising at least one polymerizable olefinic unsaturation and at least one carboxylic acid functional group,
  (b2) of at least one ester of a compound derived from an acid chosen from acrylic acid, methacrylic acid, itaconic acid and maleic acid, preferably acrylic acid or methacrylic acid, (c2) of at least one compound of formula (III):

$$R^5\text{-}(EO)_p\text{---}(PO)_q\text{---}R^6 \qquad (III)$$

in which:
  p and q, which are identical or different, independently represent 0 or an integer or decimal number of less than 150, p or q being other than 0,
  EO independently represents a $CH_2CH_2O$ group,
  PO independently represents a group chosen from $CH(CH_3)CH_2O$ and $CH_2CH(CH_3)O$,
  $R^5$ represents a linear or branched $C_6$-$C_{40}$ alkyl group, preferably a linear or branched $C_8$-$C_{20}$ alkyl group, and
  $R^6$ represents a group comprising at least one polymerizable olefinic unsaturation, preferably an acrylate group or a methacrylate group, optionally
  (d2) of 2-acrylamido-2-methylpropanesulfonic acid, 2-sulfoethyl methacrylate, sodium methallylsulfonate, styrenesulfonate or one of their salts, optionally
  (e2) of at least one crosslinking monomer or at least one monomer comprising at least two olefinic unsaturations.

Preferably, according to the invention:
  p represents an integer or decimal number ranging from 20 to 40 and q is zero or
  p and q independently represent an integer or decimal number ranging from 5 to 100 or
  the ratio p/q ranges from 90/10 to 70/30.

The monomer (d2) can be defined analogously to the monomer (d1) and the monomer (e2) can be defined analogously to the monomer (e1).

Preferably, according to the invention, the copolymer (P2) of HASE type is obtained by a polymerization reaction:
  of 15% to 55% by weight, preferably of 35% to 45% by weight, of monomer (a2), based on the total amount by weight of monomers, preferably of acrylic acid, of methacrylic acid or of their mixtures,
  of 40% to 84% by weight, preferably of 45% to 55% by weight, of monomer (b2), based on the total amount by weight of monomers, preferably of an ester of acrylic acid, of an ester of methacrylic acid or of their mixtures, and
  of 1% to 20% by weight, preferably of 3% to 15% by weight, of monomer (c2), based on the total amount by weight of monomers.

A specific polymer (P2) of HASE type according to the invention is obtained by a polymerization reaction:
  of 30% by weight of monomer (a2), preferably of acrylic acid, of methacrylic acid or of their mixtures,
  of 65% by weight of monomer (b2), preferably of an ester of acrylic acid, of an ester of methacrylic acid or of their mixtures, and
  of 5% by weight of monomer (c2), based on the total amount by weight of monomers.

Another specific polymer (P2) of HASE type according to the invention is obtained by a polymerization reaction:
  of 35% by weight of monomer (a2), preferably of acrylic acid, of methacrylic acid or of their mixtures,
  of 60% by weight of monomer (b2), preferably of an ester of acrylic acid, of an ester of methacrylic acid or of their mixtures, and
  of 5% by weight of monomer (c2), based on the total amount by weight of monomers.

Also preferably according to the invention, the polymer (P3) of ASE type is in the form of an emulsion comprising water and at least one copolymer obtained by a polymerization reaction:

(a3) of at least one anionic monomer comprising at least one polymerizable olefinic unsaturation, preferably an anionic monomer comprising at least one polymerizable olefinic unsaturation and at least one carboxylic acid functional group, (b3) of at least one ester of a compound derived from an acid chosen from acrylic acid, methacrylic acid, itaconic acid and maleic acid, preferably acrylic acid or methacrylic acid, optionally (d3) of 2-acrylamido-2-methylpropanesulfonic acid, 2-sulfoethyl methacrylate, sodium methallylsulfonate, styrenesulfonate or one of their salts, optionally (e3) of at least one crosslinking monomer or at least one monomer comprising at least two olefinic unsaturations.

The monomer (d3) can be defined analogously to the monomer (d1) and the monomer (e3) can be defined analogously to the monomer (e1).

Preferably, according to the invention, the copolymer (P3) of ASE type is obtained by a polymerization reaction:

of 15% to 55% by weight, preferably of 35% to 55% by weight, of monomer (a3), based on the total amount by weight of monomers, preferably of acrylic acid or of methacrylic acid, and of 45% to 85% by weight, preferably of 45% to 65% by weight, of monomer (b3), based on the total amount by weight of monomers, preferably of an ester of acrylic acid or of an ester of methacrylic acid.

According to the invention, the compositions (C1), (C2), (C3) and (C4) can be employed alone or else can be combined. Such combinations can be provided in the form of a product comprising at least two compositions (C1), (C2), (C3) or (C4). Thus, the invention provides a product comprising at least two or three compositions according to the invention, preferably two compositions, independently chosen from the compositions (C1), (C2) and (C3) according to the invention.

The compositions according to the invention can also comprise at least one filler of inorganic particles, preferably of natural or synthetic inorganic particles of (natural or synthetic) calcium carbonate, of talc, of dolomite, of kaolin or of titanium dioxide. They can also comprise at least one binding agent of latex type. The compositions according to the invention can also combine at least one synthetic binding agent or binding agent of natural origin, for example a latex, starch, soybean proteins and at least one filler of inorganic particles, preferably of natural or synthetic inorganic particles, of (natural or synthetic) calcium carbonate, of talc, of dolomite, of kaolin or of titanium dioxide.

The use of an aqueous composition according to the invention to prepare a paper coating colour also comes within the invention. Thus, the invention provides a paper coating colour comprising at least one composition according to the invention.

The paper coating colours prepared according to the invention are particularly advantageous during the preparation of a priming coating coat (precoat) or during the preparation of a paper final coating coat (top coat) or also of a single coat.

The compositions according to the invention can also be employed to prepare a coating composition, preferably a paint, an ink composition, preferably an ink composition for inkjet printing, or a care composition, preferably a care composition for the body or hair.

The invention also provides a thickening agent comprising at least one copolymer according to the invention or at least one composition according to the invention.

This agent according to the invention can be employed to prepare a coating composition, preferably a paint, an ink composition, preferably an ink composition for inkjet printing, or a care composition, preferably a care composition for the body or hair. The use of such an agent to prepare a paper coating colour also comes within the invention.

The specific, advantageous or preferred, characteristics of the copolymers according to the invention, in particular of the copolymer (P1) according to the invention, make it possible to analogously define compositions, agents or uses according to the invention.

The examples which follow make it possible to illustrate the different aspects of the invention.

EXAMPLES

All the reactions for the synthesis of copolymers described were carried out in a cylindrical glass reactor with a working volume of 1 litre equipped with a mechanical stirrer of anchor type and with an oil bath heating system. Stirring is maintained throughout the duration of the synthesis.

A—Preparation and Characterization of Copolymers According to the Invention

Example A1

An initial charge composed of 513.7 g of deionized water, 217 g of a poly(ethylene glycol-co-propylene glycol) methacrylate macromonomer with a molecular weight of 3,000 g/mol (corresponding on average to 46 ethylene oxide units and 15 propylene oxide units randomly distributed), 19.9 g of acrylic acid, 6.5 g of methacrylic acid and 24 g of a tristyrylphenol methacrylate monomer ethoxylated with 25 ethylene oxide units is introduced into the glass reactor.

1.0 g of 1,8-dimercapto-3,6-dioxaoctane are weighed in a first container of disposable syringe type.

1.5 g of ammonium persulfate are weighed in a second container of glass beaker type and are dissolved in 4.5 g of deionized water.

The reactants of the first container and the second container are introduced into the polymerization reactor when the reaction medium present in the latter reaches 67° C. Cooking is then carried out for 2 hours while maintaining the reaction medium at 65° C.±1° C.

At the end of the reaction, the combined mixture is neutralized with an amount of sodium hydroxide sufficient to achieve a pH of 5.8 and is diluted with an amount of water sufficient to achieve a solids content of 28%.

Example A2

An initial charge composed of 515 g of deionized water, 195.2 g of a poly(ethylene glycol-co-propylene glycol) methacrylate macromonomer with a molecular weight of 3,000 g/mol (corresponding on average to 46 ethylene oxide units and 15 propylene oxide units randomly distributed), 23.1 g of methacrylic acid and 24 g of an n-dodecanol methacrylate monomer ethoxylated with 23 ethylene oxide units is introduced into the glass reactor.

1.1 g of 1,8-dimercapto-3,6-dioxaoctane are weighed in a first container of disposable syringe type.

0.85 g of ammonium persulfate are weighed in a second container of glass beaker type and are dissolved in 4.5 g of deionized water.

The reactants of the first container and the second container are introduced into the polymerization reactor when the reaction medium present in the latter reaches 67° C. Cooking is then carried out for 2 hours while maintaining the reaction medium at 65° C.±1° C.

At the end of the reaction, the combined mixture is neutralized with an amount of sodium hydroxide sufficient to achieve a pH of 5.5 and is diluted with an amount of water sufficient to achieve a solids content of 25%.

Example A3

An initial charge composed of 515 g of deionized water, 194.1 g of a poly(ethylene glycol-co-propylene glycol) methacrylate macromonomer with a molecular weight of 3,000 g/mol (corresponding on average to 46 ethylene oxide units and 15 propylene oxide units randomly distributed), 24.5 g of acrylic acid and 24.5 g of an oxo-dodecanol methacrylate monomer ethoxylated with 30 ethylene oxide units is introduced into the glass reactor.

0.6 g of 1,8-dimercapto-3,6-dioxaoctane are weighed in a first container of disposable syringe type.

0.85 g of ammonium persulfate are weighed in a second container of glass beaker type and are dissolved in 4.5 g of deionized water.

The reactants of the first container and the second container are introduced into the polymerization reactor when the reaction medium present in the latter reaches 67° C. Cooking is then carried out for 2 hours while maintaining the reaction medium at 65° C.±1° C.

At the end of the reaction, the combined mixture is neutralized with an amount of sodium hydroxide sufficient to achieve a pH of 4.5 and is diluted with an amount of water sufficient to achieve a solids content of 28%.

Example A4

An initial charge composed of 505 g of deionized water, 207.1 g of a poly(ethylene glycol-co-propylene glycol) methacrylate macromonomer with a molecular weight of 3,000 g/mol (corresponding on average to 46 ethylene oxide units and 15 propylene oxide units randomly distributed), 24.5 g of acrylic acid and 12.2 g of an oxo-dodecanol methacrylate monomer ethoxylated with 30 ethylene oxide units is introduced into the glass reactor.

0.6 g of 1,8-dimercapto-3,6-dioxaoctane are weighed in a first container of disposable syringe type.

0.85 g of ammonium persulfate are weighed in a second container of glass beaker type and are dissolved in 4.5 g of deionized water.

The reactants of the first container and the second container are introduced into the polymerization reactor when the reaction medium present in the latter reaches 67° C. Cooking is then carried out for 2 hours while maintaining the reaction medium at 65° C.±1° C.

At the end of the reaction, the combined mixture is neutralized with an amount of sodium hydroxide sufficient to achieve a pH of 4.5 and is diluted with an amount of water sufficient to achieve a solids content of 30%.

Example A5

An initial charge composed of 500 g of deionized water, 215.0 g of a poly(ethylene glycol-co-propylene glycol) methacrylate macromonomer with a molecular weight of 3,000 g/mol (corresponding on average to 46 ethylene oxide units and 15 propylene oxide units randomly distributed), 24.5 g of acrylic acid and 4.4 g of an oxo-dodecanol methacrylate monomer ethoxylated with 30 ethylene oxide units is introduced into the glass reactor.

0.6 g of 1,8-dimercapto-3,6-dioxaoctane are weighed in a first container of disposable syringe type.

0.85 g of ammonium persulfate are weighed in a second container of glass beaker type and are dissolved in 4.5 g of deionized water.

The reactants of the first container and the second container are introduced into the polymerization reactor when the reaction medium present in the latter reaches 67° C. Cooking is then carried out for 2 hours while maintaining the reaction medium at 65° C.±1° C.

At the end of the reaction, the combined mixture is neutralized with an amount of sodium hydroxide sufficient to achieve a pH of 4.5 and is diluted with an amount of water sufficient to achieve a solids content of 30%.

Example A6

An initial charge composed of 520 g of deionized water, 181.2 g of a poly(ethylene glycol-co-propylene glycol) methacrylate macromonomer with a molecular weight of 3,000 g/mol (corresponding on average to 46 ethylene oxide units and 15 propylene oxide units randomly distributed), 24.5 g of acrylic acid and 36.7 g of an oxo-dodecanol methacrylate monomer ethoxylated with 30 ethylene oxide units is introduced into the glass reactor.

0.6 g of 1,8-dimercapto-3,6-dioxaoctane are weighed in a first container of disposable syringe type.

0.85 g of ammonium persulfate are weighed in a second container of glass beaker type and are dissolved in 4.5 g of deionized water.

The reactants of the first container and the second container are introduced into the polymerization reactor when the reaction medium present in the latter reaches 67° C. Cooking is then carried out for 2 hours while maintaining the reaction medium at 65° C.±1° C.

At the end of the reaction, the combined mixture is neutralized with an amount of sodium hydroxide sufficient to achieve a pH of 4.5 and is diluted with an amount of water sufficient to achieve a solids content of 28%.

Example A7

An initial charge composed of 540 g of deionized water, 168.3 g of a poly(ethylene glycol-co-propylene glycol) methacrylate macromonomer with a molecular weight of 3,000 g/mol (corresponding on average to 46 ethylene oxide units and 15 propylene oxide units randomly distributed), 24.5 g of acrylic acid and 48.9 g of an oxo-dodecanol methacrylate monomer ethoxylated with 30 ethylene oxide units is introduced into the glass reactor.

0.6 g of 1,8-dimercapto-3,6-dioxaoctane are weighed in a first container of disposable syringe type.

0.85 g of ammonium persulfate are weighed in a second container of glass beaker type and are dissolved in 4.5 g of deionized water.

The reactants of the first container and the second container are introduced into the polymerization reactor when the reaction medium present in the latter reaches 67° C. Cooking is then carried out for 2 hours while maintaining the reaction medium at 65° C.±1° C.

At the end of the reaction, the combined mixture is neutralized with an amount of sodium hydroxide sufficient to achieve a pH of 5.0 and is diluted with an amount of water sufficient to achieve a solids content of 28%.

Example A8

An initial charge composed of 500 g of deionized water, 217.3 g of a poly(ethylene glycol-co-propylene glycol) methacrylate macromonomer with a molecular weight of 3,000 g/mol (corresponding on average to 46 ethylene oxide units and 15 propylene oxide units randomly distributed), 24.5 g of acrylic acid and 2.5 g of an oxo-dodecanol methacrylate monomer ethoxylated with 30 ethylene oxide units is introduced into the glass reactor.

0.6 g of 1,8-dimercapto-3,6-dioxaoctane are weighed in a first container of disposable syringe type.

0.85 g of ammonium persulfate are weighed in a second container of glass beaker type and are dissolved in 4.5 g of deionized water.

The reactants of the first container and the second container are introduced into the polymerization reactor when the reaction medium present in the latter reaches 67° C. Cooking is then carried out for 2 hours while maintaining the reaction medium at 65° C.±1° C.

At the end of the reaction, the combined mixture is neutralized with an amount of sodium hydroxide sufficient to achieve a pH of 5.6 and is diluted with an amount of water sufficient to achieve a solids content of 30%.

Example A9

An initial charge composed of 515 g of deionized water, 194.1 g of a poly(ethylene glycol-co-propylene glycol) methacrylate macromonomer with a molecular weight of 3,000 g/mol (corresponding on average to 46 ethylene oxide units and 15 propylene oxide units randomly distributed), 24.5 g of acrylic acid and 24.5 g of an n-dodecanol methacrylate monomer ethoxylated with 23 ethylene oxide units is introduced into the glass reactor.

0.6 g of 1,8-dimercapto-3,6-dioxaoctane are weighed in a first container of disposable syringe type.

0.85 g of ammonium persulfate are weighed in a second container of glass beaker type and are dissolved in 4.5 g of deionized water.

The reactants of the first container and the second container are introduced into the polymerization reactor when the reaction medium present in the latter reaches 67° C. Cooking is then carried out for 2 hours while maintaining the reaction medium at 65° C.±1° C.

At the end of the reaction, the combined mixture is neutralized with an amount of sodium hydroxide sufficient to achieve a pH of 5.2 and is diluted with an amount of water sufficient to achieve a solids content of 30%.

Example A10

An initial charge composed of 515 g of deionized water, 200 g of a poly(ethylene glycol) methacrylate macromonomer with a molecular weight of 5,000 g/mol (corresponding to approximately 110 ethylene oxide units), 24.5 g of acrylic acid and 24.5 g of an n-dodecanol methacrylate monomer ethoxylated with 23 ethylene oxide units is introduced into the glass reactor.

0.6 g of 1,8-dimercapto-3,6-dioxaoctane are weighed in a first container of disposable syringe type.

0.85 g of ammonium persulfate are weighed in a second container of glass beaker type and are dissolved in 4.5 g of deionized water.

The reactants of the first container and the second container are introduced into the polymerization reactor when the reaction medium present in the latter reaches 67° C. Cooking is then carried out for 2 hours while maintaining the reaction medium at 65° C.±1° C.

At the end of the reaction, the combined mixture is neutralized with an amount of sodium hydroxide sufficient to achieve a pH of 5.2 and is diluted with an amount of water sufficient to achieve a solids content of 25%.

Example A11

An initial charge composed of 515 g of deionized water, 194.1 g of a poly(ethylene glycol-co-propylene glycol) methacrylate macromonomer with a molecular weight of 3,000 g/mol (corresponding on average to 46 ethylene oxide units and 15 propylene oxide units randomly distributed), 24.5 g of acrylic acid and 24.5 g of an n-docosanol methacrylate monomer ethoxylated with 25 ethylene oxide units is introduced into the glass reactor.

0.6 g of 1,8-dimercapto-3,6-dioxaoctane are weighed in a first container of disposable syringe type.

0.85 g of ammonium persulfate are weighed in a second container of glass beaker type and are dissolved in 4.5 g of deionized water.

The reactants of the first container and the second container are introduced into the polymerization reactor when the reaction medium present in the latter reaches 67° C. Cooking is then carried out for 2 hours while maintaining the reaction medium at 65° C.±1° C.

At the end of the reaction, the combined mixture is neutralized with an amount of sodium hydroxide sufficient to achieve a pH of 5.5 and is diluted with an amount of water sufficient to achieve a solids content of 25%.

Example A12

An initial charge composed of 502 g of deionized water, 207.1 g of a poly(ethylene glycol-co-propylene glycol) methacrylate macromonomer with a molecular weight of 3,000 g/mol (corresponding on average to 46 ethylene oxide units and 15 propylene oxide units randomly distributed), 24.5 g of acrylic acid and 12.2 g of an n-dodecanol methacrylate monomer ethoxylated with 23 ethylene oxide units is introduced into the glass reactor.

0.6 g of 1,8-dimercapto-3,6-dioxaoctane are weighed in a first container of disposable syringe type.

0.85 g of ammonium persulfate are weighed in a second container of glass beaker type and are dissolved in 4.5 g of deionized water.

The reactants of the first container and the second container are introduced into the polymerization reactor when the reaction medium present in the latter reaches 67° C. Cooking is then carried out for 2 hours while maintaining the reaction medium at 65° C.±1° C.

At the end of the reaction, the combined mixture is neutralized with an amount of sodium hydroxide sufficient to achieve a pH of 4.6 and is diluted with an amount of water sufficient to achieve a solids content of 30%.

Characterizations of the Polymers According to the Invention

The solids content of the synthesized products is measured using a heat chamber at 110° C. 1 g of product is placed in the heat chamber for 1 h. The difference in weight before and after drying makes it possible to determine the solids content.

The pH is measured at 25° C. with a pH meter of WTW trade mark equipped with a conventional electrode coupled to a temperature probe.

The results obtained are presented in Table 1. The monomers employed are also defined in Table 1; their respective proportions by weight based on the total mass amount of monomers are shown therein. The monomers (a1) AA and MAA are respectively acrylic acid and methacrylic acid. The macromonomer (b1) is poly(ethylene glycol-co-propylene glycol) methacrylate (b1-1) with a molecular weight of 3,000 g/mol and the macromonomer (b1) is poly(ethylene glycol) methacrylate (b1-2) with a molecular weight of 5,000 g/mol. The different monomers (e1) are also defined.

TABLE 1

| Example | (a1) (amount) (%) | (b1) (amount) (%) | (c1) (amount) (%) | Viscosity (mPa · s) | Solids content (%) | pH |
|---|---|---|---|---|---|---|
| A1 | AA (7.5) + MAA (2.5) | b1-1 (84.5) | Tristyrylphenol methacrylate-25 EO (5.5) | 15,700 | 27.5 | 5.8 |
| A2 | MAA (11) | b1-1 (84) | n-Dodecanol methacrylate-23 EO (5) | 410 | 25.3 | 5.5 |
| A3 | AA (10) | b1-1 (80) | Oxo-dodecanol methacrylate-30 EO (10) | 2,300 | 28 | 4.3 |
| A4 | AA (10) | b1-1 (85) | Oxo-dodecanol methacrylate-30 EO (5) | 680 | 29.1 | 4.6 |
| A5 | AA (10) | b1-1 (88) | Oxo-dodecanol methacrylate-30 EO (2) | 480 | 29.3 | 4.5 |
| A6 | AA (10) | b1-1 (75) | Oxo-dodecanol methacrylate-30 EO (15) | 5,200 | 28 | 4.5 |
| A7 | AA (10) | b1-1 (70) | Oxo-dodecanol methacrylate-30 EO (20) | 8,400 | 27.7 | 4.5 |
| A8 | AA (10) | b1-1 (89) | Oxo-dodecanol methacrylate-30 EO (1) | 560 | 31.8 | 5.6 |
| A9 | AA (10) | b1-1 (80) | n-Dodecanol methacrylate-30 EO (10) | 1,400 | 29.2 | 5.2 |
| A10 | AA (10) | b1-2 (80) | n-Dodecanol methacrylate-30 EO (10) | 3,200 | 25.5 | 5.2 |
| A11 | AA (10) | b1-1 (80) | n-Docosanol methacrylate-25 EO (10) | 7,200 | 25.3 | 5.5 |
| A12 | AA (10) | b1-1 (85) | n-Dodecanol methacrylate-23 EO (5) | 1,000 | 29.0 | 4.6 |

B—Preparation and Characterization of Compositions According to the Invention and of Comparative Compositions Compositions for paper coating colours are prepared. The polymers according to the invention or polymers of the state of the art are employed in combination with the following products:
- pigment $CaCO_3$: H60, H90 or H95 Hydrocarb Omya,
- pigment kaolin: Hydragloss 90 Kamin,
- binding agent: latex DL 1066 Trinseo,
- binding agent: starch Stabilys A30 Roquette,
- thickening agent: carboxymethylcellulose (CMC) Finnfix 10 CP Kelco,
- optical brightener: Blankophor PT Blankophor Gmbh,
- activating agent for optical brightness: polyvinyl alcohol (PV—OH) M 4-98 Chang Chung Petrochemical,
- commercial thickening copolymer based on acrylic polymer Rheocoat 35 Coatex,
- commercial thickening copolymer based on acrylic polymer Rheocoat 73 Coatex,
- commercial thickening copolymer based on acrylic polymer Rheocoat 93 Coatex,
- commercial thickening copolymer based on acrylic polymer Rheocarb 101 Coatex and
- commercial thickening formulation based on acrylic polymer Rheocarb 131 Coatex.

The compositions are applied conventionally to paper as priming coat or as top coat. The application as top coat is carried out on precoated base paper of 78 g/m² using a trailing-blade pilot coater from Dow and final calendering at 80° C., 40 bar and two passes per face.

The solids content of the compositions prepared is measured using a heat chamber at 110° C. 1 g of product is placed in the heat chamber for 1 h. The difference in weight before and after drying makes it possible to determine the solids content.

The pH is measured at 25° C. with a pH meter of WTW trade mark equipped with a conventional electrode coupled to a temperature probe.

The Brookfield viscosity of the compositions prepared is measured at 10 rev/min and at 25° C. using an analogue viscometer. The spindle is chosen as a function of the viscosity of the composition under consideration in order to be within the optimum use range of the rheometer.

The ACAV capillary viscosity at $10^6$ s$^{-1}$ is measured using an ACAV A2 capillary viscometer from ACA.

The water retention is determined using an AAGWR device from Gradek. It comprises a measurement chamber in which a test paper (Test Blotter Paper Gradek), covered with a perforated plastic fabric (Test Filter PCTE Gradek—2 μm), is positioned. 10 ml of paper coating colour are subsequently introduced into the chamber. The AAGWR device makes it possible to exert a pressure (1.5 bar) on the paper coating colour, resulting in all or part of the water and water-soluble substances present in the colour passing through the perforated plastic fabric and migrating into the test paper. A pressure of 1.5 bar is applied for 90 s. The difference between the weight of the test paper before the measurement (W0) and after the measurement (W1) gives the amount of water and of water-soluble substances present in the paper coating colour which have migrated into the test paper during the measurement. The relative value for increase in the water retention is equal to 1,250×(W1−W0)/W0.

The weight of the coat is determined by subtracting the weight of a coated paper, obtained by cutting out a disc of coated paper of a hundredth of a square metre, from the weight of a disc of a hundredth of a square metre of virgin paper.

The R457 whiteness with or without UV irradiation (R 457+UV and R 457−UV) and the opacity of the samples of coated paper are measured using an Elrepho 3,000 device from Datacolor.

The W (CIE) whiteness is measured according to Standard ISO FDIS 11475. It is representative of the degree of optical brightness of the coated paper.

The TAPPI 75° DIN whiteness is measured according to Standard TAPPI T480 OS-78 using a glossmeter from Lehmann Cotem.

Example B1: Compositions for Starch Free Priming Paper Coating Colours

The different components are mixed according to the proportions (g) presented in Table 2.

TABLE 2

| | Composition | | | | | | |
|---|---|---|---|---|---|---|---|
| | Comparative | | | | | According to the invention | |
| | B1 | B2 | B3 | B4 | B5 | B6 | B7 |
| H60 | 100 | 100 | 100 | 100 | 100 | 100 | 100 |
| DL 1066 | 9 | 9 | 9 | 9 | 9 | 9 | 9 |
| Finnfix 10 | | 0.63 | | | | | |
| Rheocoat 35 | | | 0.35 | | | | |
| Rheocoat 93 | | | | 0.18 | | | |
| Rheocarb 131 | | | | | 0.72 | | |
| Polymer A9 | | | | | | 1.21 | |
| Polymer A3 | | | | | | | 1.1 |

The properties of the compositions are evaluated and the results are presented in Table 3.

TABLE 3

| | Composition | | | | | | |
|---|---|---|---|---|---|---|---|
| | Comparative | | | | | According to the invention | |
| | B1 | B2 | B3 | B4 | B5 | B6 | B7 |
| Solids content | 71.3 | 71.6 | 71.6 | 71.6 | 71.5 | 70.8 | 71.4 |
| pH | 8.8 | 8.8 | 8.8 | 8.8 | 8.8 | 8.8 | 8.8 |
| Brookfield viscosity | 285 | 2,000 | 2,020 | 2,255 | 1,680 | 1,500 | 1,600 |
| Capillary viscosity | 70 | 79 | 138 | 104 | 119 | 72 | 76 |
| Water retention | 413 | 266 | 120 | 141 | 99 | 67 | 66 |

Despite viscosities which would be acceptable for the deposition and the handling as paper coating colour, in particular for facilitating the surface application of the formulation on the paper, the composition B2 comprising a cellulose thickener (CMC, Finnfix 10) exhibits a water retention which is insufficient for such a use. The solids content of this composition would be unstable during the surface application.

Unlike the compositions according to the invention B6 and B7, the comparative compositions B3, B4 and B5 do not make it possible to combine a low capillary viscosity and a reduced water retention value.

Example B2: Compositions for Paper Pre-Coating Colours with Starch

The different components are mixed according to the proportions (g) presented in Table 4. Three repetitions were carried out.

TABLE 4

|  | Composition | | | | | | | |
|---|---|---|---|---|---|---|---|---|
|  | Comparative | | | | According to the invention | | | |
|  | B8 | B9 | B10 | B11 | B12 | B13 | B14 | B15 |
| H60 | 100 | 100 | 100 | 100 | 100 | 100 | 100 | 100 |
| DL 1066 | 9 | 6 | 6 | 6 | 9 | 9 | 9 | 9 |
| Stabilys A30 | 0 | 4 | 4 | 4 | 4 | 4 | 4 | 4 |
| Finnfix 10 |  |  | 0.26 |  |  |  |  |  |
| Rheocoat 93 |  |  |  | 0.07 |  |  |  |  |
| Rheocarb 131 |  |  |  |  | 0.2 |  |  |  |
| Polymer A9 |  |  |  |  |  | 0.2 | 0.2 | 0.2 |

The properties of the compositions are evaluated and the results are presented in Table 5.

TABLE 5

|  | Composition | | | | | | | |
|---|---|---|---|---|---|---|---|---|
|  | Comparative | | | | According to the invention | | | |
|  | B8 | B9 | B10 | B11 | B12 | B13 | B14 | B15 |
| Solids content | 71.6 | 71.6 | 70.6 | 71.5 | 71 | 71 | 71 | 71 |
| pH | 8.8 | 8.8 | 8.8 | 8.8 | 9 | 8.9 | 8.9 | 8.9 |
| Brookfield viscosity | 380 | 740 | 2,110 | 2,440 | 1,960 | 1,950 | 2,055 | 2,050 |
| Capillary viscosity | 76 | 123 | 118 | 153 | 142 | 124 | 111 | 118 |
| Water retention | 401 | 123 | 125 | 97 | 78 | 83 | 80 | 83 |

In the presence of starch, unlike the compositions according to the invention B12 to B15, for the comparative compositions B9 to B11, the water retention is improved to the detriment of an increase in the capillary viscosity.

Example B3: Compositions for Starch Free Priming Paper Top-Coating Colours

The different components are mixed according to the proportions (g) presented in Table 6.

TABLE 6

|  | Composition | | | |
|---|---|---|---|---|
|  | Comparative | | According to the invention | |
|  | B16 | B17 | B18 | B19 |
| Hydrocarb H95 | 100 | 100 | 100 | 100 |
| DL 1066 | 9 | 9 | 9 | 9 |
| M 4-98 | 0.5 | 0.5 | 0.5 | 0.5 |
| Blankophor PT | 1 | 1 | 1 | 1 |
| Rheocoat 73 |  | 0.13 |  |  |
| Polymer A9 |  |  | 0.34 |  |
| Polymer A3 |  |  |  | 0.34 |

The properties of the compositions are evaluated and the results are presented in Table 7.

TABLE 7

|  | Composition | | | |
|---|---|---|---|---|
|  | Comparative | | According to the invention | |
|  | B16 | B17 | B18 | B19 |
| Solids content | 70.5 | 69 | 70.5 | 70.5 |
| pH | 8.8 | 8.6 | 8.7 | 8.6 |
| Brookfield viscosity | 460 | 1.050 | 740 | 710 |
| Capillary viscosity | 154 | 164 | 133 | 135 |
| Water retention | 192 | 134 | 108 | 110 |
| Coat weight | 13 | 15 | 13 | 13 |
| R 457 + UV Whiteness | 96.3 | 93.5 | 97.4 | 97.5 |
| R 457 − UV Whiteness | 85.5 | 84.2 | 85.6 | 85.7 |
| W CIE Whiteness | 118 | 110 | 122 | 122 |
| Opacity | 92 | 93 | 92 | 92 |
| Gloss | 76 | 74 | 75 | 75 |

Again, despite viscosities which would be acceptable for the deposition and the handling as paper coating colour, in particular for facilitating the surface application of the formulation on the paper, the comparative compositions exhibit a water retention which is insufficient for such a use. The solids content of these compositions would be unstable during the surface application.

Unlike the compositions according to the invention B18 and B19, the comparative compositions B16 and B17 do not make it possible to combine a low capillary viscosity and a reduced water retention value.

In addition, the compositions according to the invention make it possible to retain or to improve the optical properties of the coated papers.

Example B4: Compositions for Paper Top-Coating Colours with Starch

The different components are mixed according to the proportions (g) presented in Table 8.

TABLE 8

| | Composition | | | | |
|---|---|---|---|---|---|
| | Comparative | | According to the invention | | |
| | B21 | B22 | B23 | B24 | B25 |
| H95 Me | 100 | 100 | 100 | 100 | 100 |
| DL 1066 | 8 | 8 | 8 | 8 | 8 |
| Stabilys A30 | 2 | 2 | 2 | 2 | 2 |
| M 4-98 | 0.5 | 0.5 | 0.5 | 0.5 | 0.5 |
| Blankophor PT | 0.8 | 0.8 | 0.8 | 0.8 | 0.8 |
| Rheocarb 101 | | 0.5 | | | |
| Polymer A9 | | | 0.5 | | |
| Polymer A12 | | | | 0.5 | |
| Polymer A3 | | | | | 0.5 |

The properties of the compositions are evaluated and the results are presented in Table 9.

TABLE 9

| | Composition | | | | |
|---|---|---|---|---|---|
| | Comparative | | According to the invention | | |
| | B21 | B22 | B23 | B24 | B25 |
| Solids content | 70.2 | 70.1 | 70 | 70 | 70.2 |
| pH | 9 | 9 | 9 | 9 | 9 |
| Brookfield viscosity | 664 | 1.600 | 1.800 | 1.690 | 1.595 |
| Capillary viscosity | 152 | 165 | 147 | 123 | 104 |
| Water retention | 111 | 71 | 69 | 62 | 55 |
| Coat weight | 13 | 13 | 13 | 14 | 14 |
| R 457 + UV Whiteness | 98.4 | 98.9 | 99.2 | 99.4 | 99.5 |
| R 457 − UV Whiteness | 85.9 | 86 | 86.1 | 86.2 | 86.3 |
| W CIE Whiteness | 125 | 128 | 128 | 129 | 129 |
| Gloss | 73 | 72 | 70 | 70 | 72 |

Again, the compositions according to the invention have a capillary viscosity and a water retention which render them usable as paper coating colours which are improved with respect to the comparative compositions.

The invention claimed is:

1. A copolymer (P1), obtained by a polymerization reaction of a monomer composition consisting of:
   (a1) 5% to 30% by weight, based on the total amount by weight of monomers, at least one anionic monomer selected from the group consisting of acrylic acid and methacrylic acid,
   (b1) 65% to 90% by weight, based on the total amount by weight of monomers, at least one monomer of formula (I):

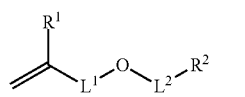

in which:
R$^1$ and R$^2$, which are identical or different, independently represent H or CH$_3$,
L$^1$ independently represents a group chosen from C(O), CH$_2$ and CH$_2$—CH$_2$,
L$^2$ independently represents a group chosen from (CH$_2$—CH$_2$O)$_x$, (CH(CH$_3$)CH$_2$O)$_y$ and combinations thereof, and
x and y, which are identical or different, independently represent 0 or an integer or decimal number between 0.1 and 150, wherein x is strictly greater than y and the sum x+y is between 10 and 150, and
   (c1) 0.5% to 30% by weight, based on the total amount by weight of monomers, at least one monomer of formula (II):

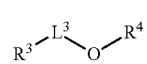

in which:
R$^3$ independently represents a functional group derived from a compound selected from the group consisting of acrylate, methacrylate, acrylurethane and methacrylurethane,
R$^4$ independently represents a saturated, linear hydrocarbon group comprising from 6 to 40 carbon atoms, an unsaturated linear hydrocarbon group comprising from 6 to 40 carbon atoms, a saturated branched hydrocarbon group comprising from 6 to 40 carbon atoms, an unsaturated branched hydrocarbon group comprising from 6 to 40 carbon atoms, a saturated cyclic hydrocarbon group comprising from 6 to 40 carbon atoms, an unsaturated cyclic hydrocarbon group comprising from 6 to 40 carbon atoms, or an aromatic hydrocarbon group comprising from 6 to 40 carbon atoms,
L$^3$ independently represents a group chosen from (OCH$_2$—CH$_2$)$_m$, (OCH(CH$_3$)CH$_2$)$_n$ and combinations thereof, and
m and n, which are identical or different, independently represent 0 or an integer or decimal number between 0.1 and 150, wherein m is strictly greater than n and the sum m+n is between 10 and 150, and
   (d1) optionally 0.1% to 7% by weight, based on the total amount by weight of monomers, of at least one additional monomer selected from the group consisting of 2-acrylamido-2-methylpropanesulfonic acid, 2-sulfoethyl methacrylate, sodium methallylsulfonate, and styrenesulfonate, or a salt thereof, and
   (e1) optionally 0.01% to 5% by weight, based on the total amount by weight of monomers, of at least one cross-linking monomer or at least one monomer comprising at least two olefinic unsaturations.

2. The copolymer (P1) of claim 1, wherein at least two different anionic monomers (a1) are present in said composition.

3. The copolymer (P1) of claim 1, wherein (a1) is present in an amount of 6% to 25% by weight based on a total amount by weight of monomers.

4. The copolymer (P1) of claim 1, wherein:
R$^1$ represents H, or
L$^1$ represents a group chosen from C(O) and CH$_2$, or
L$^2$ represents a group comprising (CH$_2$—CH$_2$O)$_x$ and (CH(CH$_3$)CH$_2$O)$_y$, or
x represents an integer or decimal number between 10 and 140, or
y represents an integer or decimal number between 10 and 140 or
x is strictly greater than y and the sum x+y is between 10 and 150.

5. The copolymer (P1) of claim 1, wherein:
x represents an integer or decimal number between 15 and 140,
y represents an integer or decimal number between 10 and 135 and x is strictly greater than y and the sum x+y is between 10 and 150,
or wherein:
x represents an integer or decimal number between 15 and 140 and
y represents 0.

6. The copolymer (P1) of claim 1, wherein
x represents an integer or decimal number between 15 and 80 and y represents an integer or decimal number between 10 and 65, or
x represents an integer or decimal number between 15 and 80 and y represents 0.

7. The copolymer (P1) of claim 1, wherein (b1) is present in an amount of 75% to 90% by weight based on a total amount by weight of monomers.

8. The copolymer (P1) of claim 1, wherein at least two different monomers (c1) are present in said composition.

9. The copolymer (P1) of claim 1, wherein:
$R^4$ independently represents a linear or branched $C_6$-$C_{40}$ alkyl group, or
$L^3$ represents a $(OCH_2CH_2)$, group, or
m represents an integer or decimal number between 10 and 140, or
n represents an integer or decimal number between 10 and 140, or
m is strictly greater than n and the sum m+n is between 10 and 150.

10. The copolymer (P1) of claim 1, wherein:
$R^4$ independently represents a linear or branched $C_6$-$C_{40}$ alkyl group,
$L^3$ represents a $(OCH_2CH_2)_m$ group, and
m represents an integer or decimal number between 10 and 140.

11. The copolymer (P1) of claim 1, wherein (c1) is present in an amount of 1% to 25% by weight based on a total amount by weight of monomers.

12. The copolymer (P1) of claim 1, wherein (d1) is present.

13. The copolymer (P1) of claim 1, wherein the composition wherein (e1) is present.

14. A thickening agent, comprising at least one copolymer (P1) of claim 1 or
at least one of:
a composition (C1) comprising:
the at least one copolymer (P1) and
water,
a composition (C2) comprising:
the at least one copolymer (P1),
water and
at least one polymer HASE type (P2),
a composition (C3) comprising:
the at least one copolymer (P1),
water and
at least one ASE type polymer (P3), and
a composition (C4) comprising:
the at least one copolymer (P1),
water,
at least one HASE type polymer (P2) and
at least one ASE type polymer (P3).

15. A method of preparing a coating composition, the method comprising combining the thickening agent of claim 14 with a pigment, binding agent, thickening agent, optical brightener, activating agent, or thickening copolymer or formulation.

* * * * *